(12) United States Patent
Glora

(10) Patent No.: US 7,377,256 B2
(45) Date of Patent: May 27, 2008

(54) METHOD FOR OPERATING A DRIVE UNIT

(75) Inventor: Michael Glora, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 10/974,648

(22) Filed: Oct. 26, 2004

(65) Prior Publication Data

US 2005/0113212 A1 May 26, 2005

(30) Foreign Application Priority Data

Oct. 30, 2003 (DE) ................. 103 50 778

(51) Int. Cl.
*F02D 41/12* (2006.01)
*B60W 10/00* (2006.01)

(52) U.S. Cl. ............... 123/325; 123/332; 123/436; 123/493

(58) Field of Classification Search ........ 123/399, 123/305, 325, 326, 332, 333, 406.5, 406.51, 123/406.52, 492–493, 436, 481; 701/110, 701/112; 477/170, 173–175

See application file for complete search history.

(56) References Cited

U.S. PATENT DOCUMENTS

| | | | |
|---|---|---|---|
| 3,735,742 A * | 5/1973 | Aono et al. ............ 123/333 |
| 5,484,351 A | 1/1996 | Zhang et al. |
| 5,547,037 A | 8/1996 | Torii |
| 5,646,851 A | 7/1997 | O'Connell et al. |
| 5,676,112 A * | 10/1997 | Bauer et al. ........... 123/333 |
| 6,065,446 A * | 5/2000 | Engl et al. ............. 123/325 |
| 6,095,945 A * | 8/2000 | Graf ....................... 477/97 |
| 6,104,976 A | 8/2000 | Nakamura |
| 6,125,314 A * | 9/2000 | Graf et al. ............. 701/53 |
| 6,223,717 B1 * | 5/2001 | Wiemers ................ 123/295 |
| 6,364,808 B1 | 4/2002 | Saur |
| 6,418,907 B1 * | 7/2002 | Frech et al. ............ 123/325 |
| 6,827,070 B2 * | 12/2004 | Fehl et al. ............. 123/682 |
| 6,938,609 B2 * | 9/2005 | Kustosch ............... 123/333 |
| 7,051,516 B2 * | 5/2006 | Pott et al. .............. 60/285 |
| 2005/0288146 A1 * | 12/2005 | Englisch et al. ....... 477/2 |
| 2006/0231068 A1 * | 10/2006 | Weiss et al. ........... 123/325 |
| 2007/0173375 A1 * | 7/2007 | Heber et al. ........... 477/170 |
| 2008/0022969 A1 * | 1/2008 | Frenz et al. ........... 123/347 |

FOREIGN PATENT DOCUMENTS

DE     102004036801 A1 *  3/2006

* cited by examiner

*Primary Examiner*—Hai H Huynh
(74) *Attorney, Agent, or Firm*—Kenyon & Kenyon LLP

(57) ABSTRACT

A method for operating a drive unit, in which, given the use of a vehicle-speed controller, the actual speed is prevented from exceeding the setpoint speed too significantly. In the method, a setpoint value for an output variable of the drive unit is predetermined. An overrun fuel cutoff of the drive unit is enabled as soon as the setpoint value for the output variable falls below a characteristic value for the overrun fuel cutoff.

9 Claims, 3 Drawing Sheets

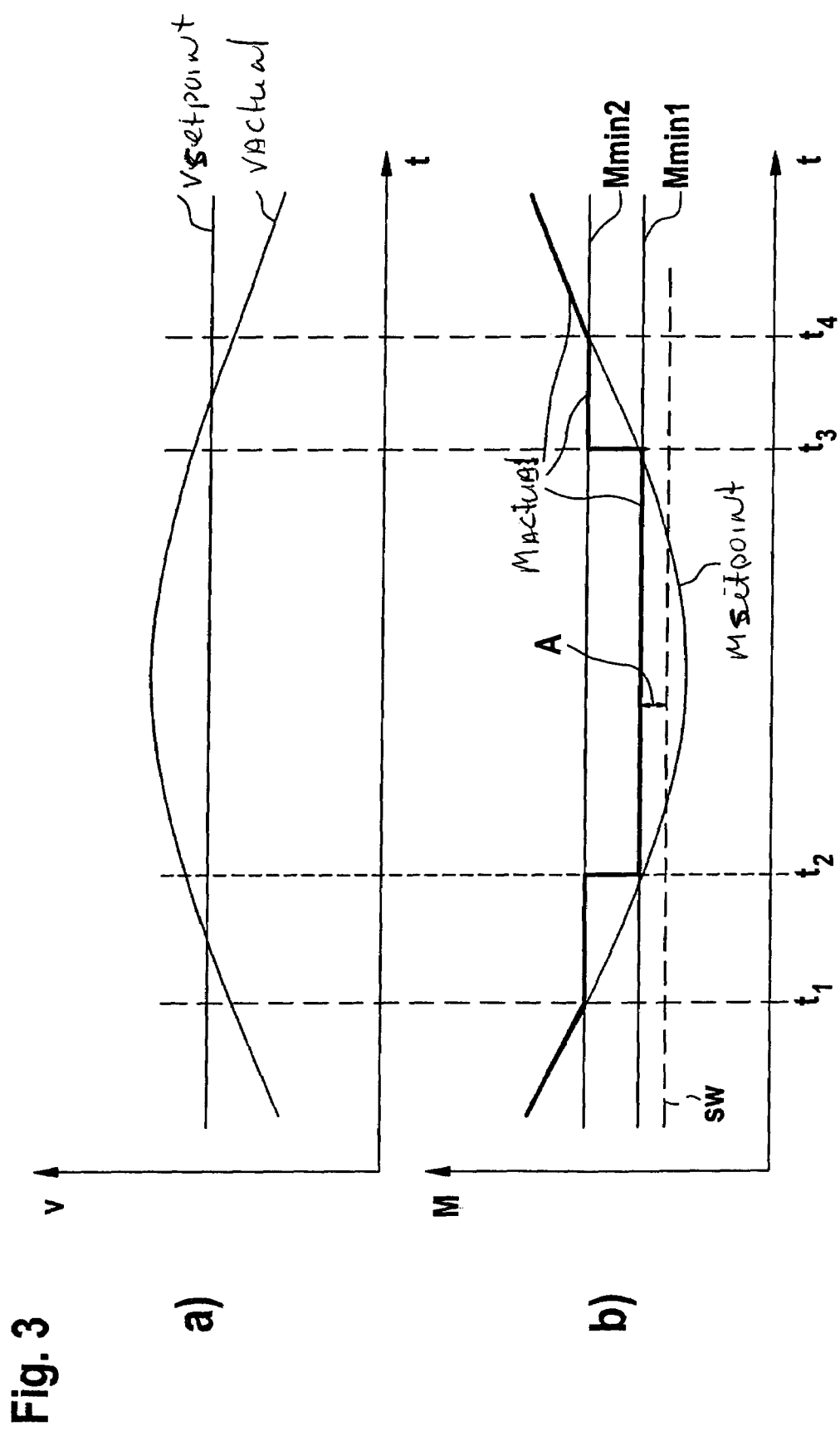

METHOD FOR OPERATING A DRIVE UNIT

BACKGROUND INFORMATION

Methods for operating a drive unit, in which a setpoint value is predetermined for an output variable of the drive unit, are already known. Thus, in a drive unit of a motor vehicle, for example, having an internal combustion engine, it is not possible to produce any arbitrarily small torque, but rather a torque range exists which cannot be set between the overrun fuel cutoff, at which the absolute smallest torque without fuel injection lies, and operation using a torque at the minimum fuel injection required for operating the internal combustion engine. For operation using a vehicle-speed controller, cruise control operation, frequent switching back and forth between operation of the drive unit using overrun fuel cutoff and operation of the drive unit using minimum fuel injection is to be avoided, since the surges connected with the torque jumps resulting therefrom are disturbing to the driver of the vehicle. To avoid such overly frequent switching back and forth, speed-dependent hysteresis is used. In this case, during normal operation, in which an actual speed of the vehicle approximately corresponds to a setpoint speed, overrun fuel cutoff is forbidden. In such an operating state, the minimum settable torque corresponds to the torque at minimum fuel injection. If the difference between the actual speed and the setpoint speed exceeds a predetermined threshold value, the overrun fuel cutoff is enabled and the minimum settable torque jumps to the absolute smallest torque without fuel injection. To avoid too frequent switching back and forth, the predetermined threshold value is typically set to comparatively high speed differences, so that the overrun fuel cutoff first becomes active when the setpoint speed has already been significantly exceeded, while traveling on a downgrade, for example.

SUMMARY OF THE INVENTION

The method according to the present invention for operating a drive unit has the advantage that overrun fuel cutoff of the drive unit is enabled as soon as the setpoint value for an output variable of the drive unit falls below a characteristic value for the overrun fuel cutoff. In this way, in the case of a vehicle driven by the drive unit, the overrun fuel cutoff is no longer enabled as a function of speed, but rather as a function of the output variable of the drive unit. This typically results in earlier enabling of the overrun fuel cutoff and therefore to the setpoint speed not being exceeded to such a great extent. This allows a compromise between, on one hand, the prevention of excessive switching back and forth from operation of the drive unit using overrun fuel cutoff and operation of the drive unit using minimum fuel injection and, on the other hand, the prevention of undesirably sharp exceeding of the setpoint speed. Significant, disturbing exceeding of the setpoint speed is thus prevented.

It is especially advantageous for a minimum actual value, which is reached by the output variable in the event of overrun fuel cutoff, to be selected as the characteristic value. In this way, the overrun fuel cutoff is first enabled when the setpoint value for the output variable may also be reached during operation of the drive unit using overrun fuel cutoff. In this way, the overrun fuel cutoff may be enabled at the earliest possible instant.

It is also advantageous when a threshold value, which is below a minimum actual value reached by the output variable in the event of overrun fuel cutoff, is selected as a characteristic value. In this way, enabling of the overrun fuel cutoff is delayed in relation to the earliest possible instant of its implementation, so that the hysteresis and therefore the prevention of excessive switching back and forth between operation of the drive unit using overrun fuel cutoff and operation of the drive unit using minimum fuel injection is given greater importance.

A further advantage results if the setpoint value for the output variable is predetermined by a vehicle-speed controller. In this way, even if the driver of a vehicle driven by the drive unit, with the vehicle-speed controller activated, is not able to avoid the range between operation of the drive unit using overrun fuel cutoff and operation of the drive unit using minimum fuel injection due to a lack of appropriate actuation of the accelerator pedal, it is ensured that this range is crossed as seldom as possible and excessive bucking is prevented.

A further advantage results if the output variable, in the event the setpoint value for the output variable exceeds the characteristic value for overrun fuel cutoff and falls below a minimum value for the output variable without overrun fuel cutoff, is set to the minimum value for the output variable without overrun fuel cutoff. In this way, it is ensured that the output variable assumes defined values at the limits of the range between operation of the drive unit using overrun fuel cutoff and operation of the drive unit using minimum fuel injection.

BRIEF DESCRIPTION OF THE DRAWINGS

FIG. 3a) shows a diagram of the vehicle speed over time.

FIG. 3b) shows a diagram of a torque over time to illustrate the mode of operation of the method according to the present invention.

DETAILED DESCRIPTION

Figure 1:
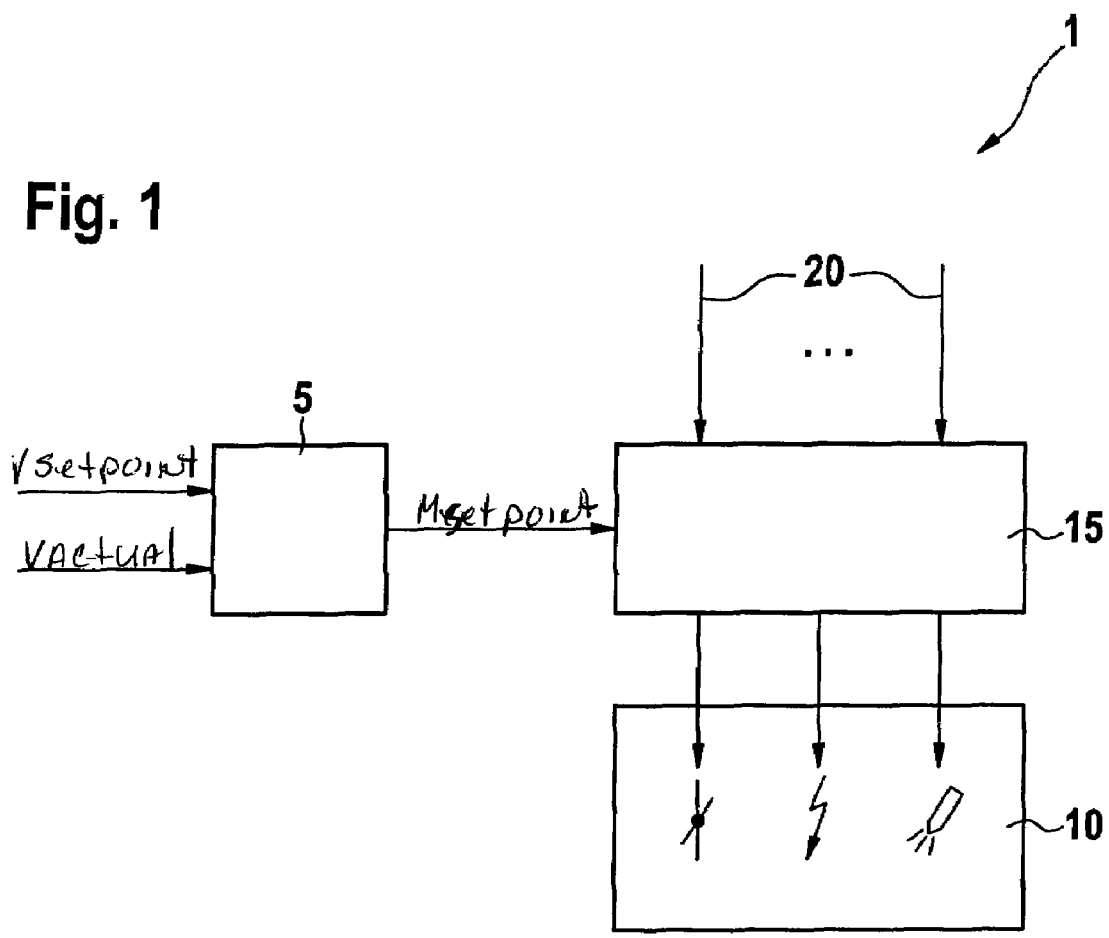
FIG. 1 shows a block diagram of the drive unit of the vehicle.

In FIG. 1, 1 identifies a drive unit of a vehicle, for example. Drive unit 1 includes an internal combustion engine 10, which may be configured as a gasoline engine or as a diesel engine, for example. In the following, it is to be assumed for exemplary purposes that internal combustion engine 10 is configured as a gasoline engine. Furthermore, drive unit 1 includes an engine control 15. A setpoint value for an output variable of drive unit 1 is supplied to engine control 15 from a vehicle-speed controller 5. The output variable may be, for example, a torque or a power output, or an output variable derived from one of the variables cited. In the following, it is to be assumed for exemplary purposes that the output variable is a torque. This may be the indicated torque produced by internal combustion engine 10. Alternatively, it may also be the transmission output torque or the wheel torque of the vehicle. In the following, it is to be assumed for exemplary purposes that the torque is the indicated torque.

Vehicle-speed controller 5 thus predetermines a setpoint value Msetpoint for the indicated torque for engine control 15. Engine control 15 implements this setpoint value Msetpoint for the indicated torque in a manner known to those skilled in the art by suitably setting an air supply, using a throttle flap, for example, by suitably setting an ignition instant, and/or by suitably setting a fuel injection quantity and/or duration. Setpoint value Msetpoint for the indicated torque is also referred to in the following as the setpoint torque. In addition, input signals 20 are supplied to engine control 15. In this case, input signals 20 are signals which identify a status of drive unit 1 and internal combustion engine 10. These input signals 20 may be, for example, signals which represent an engine temperature, an air-mass flow supplied to internal combustion engine 10, an intake-manifold pressure, an engine speed, an oxygen content in the exhaust gas, an exhaust-gas recirculation rate, or any other arbitrary operating variable of drive unit 1 and internal combustion engine 10. The operating state of drive unit 1 and internal combustion engine 10 may thus be determined in engine control 15 on the basis of input signals 20.

In addition to setpoint torque Msetpoint of vehicle-speed controller 5, engine control 15 may be supplied with further setpoint torque requirements, which relate to further vehicle functions, such as an antilock brake system, a transmission control, a traction control system, an idle-speed control, a surge-damping function, or the like. Engine control 15 then coordinates these setpoint torque requirements in a manner known to those skilled in the art in order to calculate a resulting setpoint torque to be implemented using the setting of the air supply, the ignition, and/or the injection of fuel. In the following, it is to be assumed that the resulting setpoint torque corresponds to setpoint torque Msetpoint of vehicle-speed controller 5. For this purpose, an actual value vactual for the vehicle speed is supplied to vehicle-speed controller 5 in a manner known to those skilled in the art from a vehicle speed sensor or a device for modeling the vehicle speed (not shown in FIG. 1). This value is also referred to in the following as actual speed vactual. Furthermore, a setpoint value vsetpoint for the vehicle speed is supplied to vehicle-speed controller 5 by an operating unit (not shown in FIG. 1). This value is also referred to in the following as setpoint speed vsetpoint. The operating unit may be, for example, a cruise control lever on the steering column of a vehicle. Vehicle-speed controller 5 calculates setpoint torque Msetpoint in a manner known to those skilled in the art so that the deviation between actual speed vactual and setpoint speed vsetpoint is minimized.

According to the present invention, engine control 15 calculates a value which characterizes an overrun fuel cutoff of internal combustion engine 10. This value is to be compared to the output variable of drive unit 1. Therefore, a torque value is suitable as the characterizing value. Engine control 15 thus determines the characterizing torque value for the overrun fuel cutoff, i.e., the absolute smallest indicated torque achievable without fuel injection, for the current operating state of drive unit 1 and combustion engine 10 from input variables 20. This value may be stored, for example, in a program map as a function of the operating state of drive unit 1 and combustion engine 10 and therefore as a function of input variables 20. The program map is stored in engine control 15 in this case and may have been determined previously on a test bench. The absolute smallest indicated torque achievable without fuel injection in the event of overrun fuel cutoff is also referred to in the following as first minimum torque Mmin1. As soon as setpoint torque Msetpoint of vehicle-speed controller 5 falls below first minimum torque Mmin1, the overrun fuel cutoff is enabled.

As an alternative to the absolute smallest indicated torque achievable without fuel injection in the event of overrun fuel cutoff, a threshold value below the absolute smallest indicated torque achievable without fuel injection may also be selected as the characterizing value for the overrun fuel cutoff. In this case, this threshold value may be selected in such a way that it has a predetermined distance from the absolute smallest indicated torque achievable without fuel injection. This threshold value may be stored in a program map as a function of the current operating state of drive unit 1 and internal combustion engine 10, analogously to the embodiment described above. As soon as setpoint torque Msetpoint of vehicle-speed controller 5 falls below the threshold value, the overrun fuel cutoff is enabled.

Engine control 15 determines a second minimum torque Mmin2 as a function of input variables 20 and therefore as a function of the operating state of drive unit 1 and internal combustion engine 10. In this case, second minimum torque Mmin2 characterizes operation of internal combustion engine 10 without overrun fuel cutoff. Second minimum torque Mmin2 is the minimum indicated torque achievable without overrun fuel cutoff during operation of drive unit 1 and internal combustion engine 10. This second minimum torque Mmin2 is reached, for example, when the minimum required fuel injection quantity or fuel supply is set for the operation of internal combustion engine 10. Second minimum torque Mmin2 may also be determined with the aid of a program map as a function of input variables 20, this program map also being able to be set on a test bench and stored in engine control 15.

Alternatively, first minimum torque Mmin1 and/or second minimum torque Mmin2 may also be modeled, i.e., calculated, from input variables 20 in a manner known to those skilled in the art.

The described determination of first minimum torque Mmin1 and second minimum torque Mmin2, which is based in particular on a program map, is performed in a manner known to those skilled in the art and is not the object of the present invention.

If setpoint torque Msetpoint of vehicle-speed controller 5 exceeds first minimum torque Mmin1 and falls below second minimum torque Mmin2, it may not be implemented because it is between the operation of drive unit 1 and combustion engine 10 with overrun fuel cutoff and the operation of drive unit 1 and internal combustion engine 10 without overrun fuel cutoff and with minimum fuel supply. In this case, second minimum torque Mmin2 is implemented by engine control 15.

Figure 2:
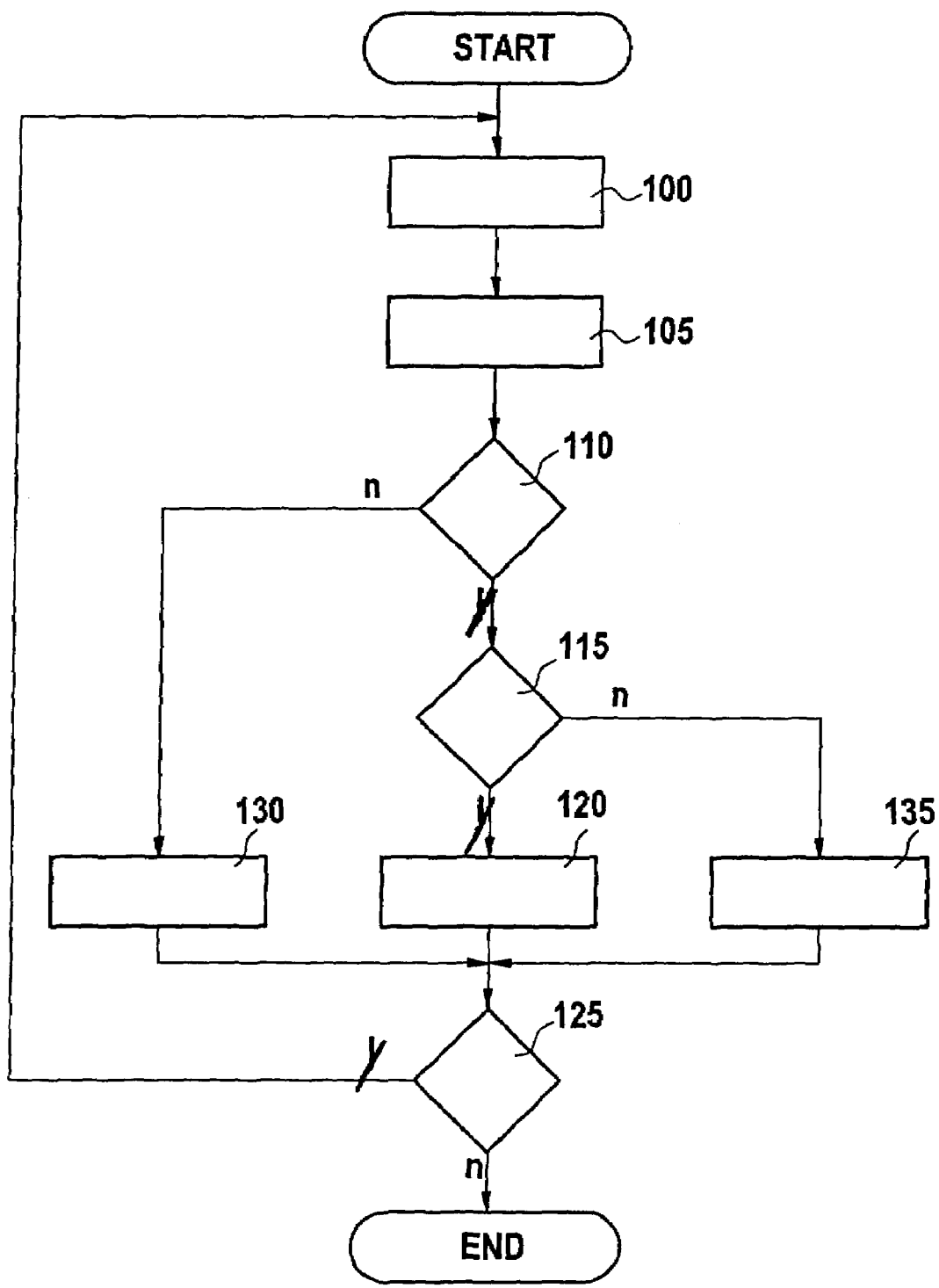
FIG. 2 shows a flow chart for an exemplary sequence of the method according to the present invention.

The method according to the present invention will be described for exemplary purposes in the following on the basis of the flowchart shown in FIG. 2. The program is started with activation of vehicle-speed controller 5 at an operating unit, such as the cruise control lever described above. At a program point 100, engine control 15 determines setpoint torque Msetpoint using input from vehicle-speed controller 5. Engine control 15 then determines the resulting setpoint torque, which is to correspond to setpoint torque Msetpoint of vehicle-speed controller 5 in this example, in the way described. However, this is not absolutely necessary for the reliability performance of the method according to the present invention. Rather, the method according to the present invention may be implemented in the same way for any arbitrary resulting setpoint torque not equal to the setpoint torque of vehicle-speed controller 5. Subsequently, the program branches to a program point 105.

At program point 105, engine control 15 uses the corresponding program maps to determine first minimum torque Mmin1 and second minimum torque Mmin2 in the way described. Subsequently, the program branches to a program point 110.

At program point 110, engine control 15 checks whether setpoint torque Msetpoint of vehicle-speed controller 5 is less than second minimum torque Mmin2. If so, the program branches to a program point 115. Otherwise, the program branches to a program point 130.

At program point 115, engine control 15 checks whether setpoint torque Msetpoint of vehicle-speed controller 5 is less than first minimum torque Mmin1. According to an alternative embodiment, engine control 15 checks at program point 115 whether setpoint torque Msetpoint of vehicle-speed controller 5 is less than the threshold value, which is less than first minimum torque Mmin1 by the predetermined distance. If the condition is fulfilled at program point 115, the program branches to a program point 120, otherwise the program branches to a program point 135.

At program point 120, engine control 15 enables the overrun fuel cutoff. This means that engine control 15 may interrupt the fuel supply, for example, in order to adjust actual speed vactual to setpoint speed vsetpoint. Subsequently, the program branches to a program point 125.

At program point 130, engine control 15 causes the complete implementation of setpoint torque Msetpoint of vehicle-speed controller 5. Subsequently, the program branches to program point 125.

At program point 135, engine control 15 causes the implementation of second minimum torque Mmin2. Subsequently, the program branches to program point 125.

At program point 125, engine control 15 checks whether vehicle-speed controller 5 is still active. If it is, the program branches back to program point 100, otherwise the program ends.

A characteristic curve of speed v of the vehicle over time t is shown for exemplary purposes in FIG. 3a). The associated characteristic curve of indicated torque M over time t is shown for exemplary purposes in FIG. 3b). In the example shown in FIG. 3a), setpoint speed vsetpoint is provided in a constant manner over time t. Actual speed vactual is initially less than setpoint speed vsetpoint. However, actual speed vactual increases initially over time t in the direction of setpoint speed vsetpoint. Therefore, setpoint torque Msetpoint requested by vehicle-speed controller 5 and, with it, actual torque Mactual, are initially reduced, which results from implementation of setpoint torque Msetpoint by correspondingly setting the air supply, the ignition, and/or the fuel injection. At a first instant t1, setpoint torque Msetpoint is less than second minimum torque Mmin2. Actual torque Mactual may thus no longer be corrected to setpoint torque Msetpoint and therefore remains at second minimum torque Mmin2. At a second instant t2, following first instant t1, setpoint torque Msetpoint is less than first minimum torque Mmin1. Therefore, engine control 15 enables the overrun fuel cutoff at second instant t2. Actual torque Mactual is therefore ideally set corresponding to first minimum torque Mmin1 starting at second instant t2 and remains at this value. Between first instant t1 and second instant t2, actual speed vactual exceeds setpoint speed vsetpoint. Because first minimum torque Mmin1 is set for actual torque Mactual, actual speed vactual approaches setpoint speed vsetpoint again after passing through a maximum. Therefore, at a third instant t3 following second instant t2, setpoint torque Msetpoint may again exceed first minimum torque Mmin1. This results in the overrun fuel cutoff being disabled again at third instant t3 and actual torque Mactual being increased to second minimum torque Mmin2 again and remaining there until a fourth instant t4 following third instant t3, at which setpoint torque Msetpoint again exceeds second minimum torque Mmin2. Therefore, from fourth instant t4, actual torque Mactual may again follow setpoint torque Msetpoint unrestrictedly. Actual speed vactual sinks below setpoint speed vsetpoint again in this case between third instant t3 and fourth instant t4.

Threshold value SW, which may not be exceeded according to an alternative embodiment in order to enable the overrun fuel cutoff, is also shown as a dashed line in FIG. 3b). This threshold value is less than first minimum torque Mmin1 at predetermined distance A. Correspondingly, if threshold value SW is used, the overrun fuel cutoff is first enabled after second instant t2 and is disabled again even before third instant t3, since setpoint torque Msetpoint first falls below threshold value SW after second instant t2 and exceeds it again even before third instant t3 in the example shown in FIG. 3b).

The method according to the present invention ensures that the overrun fuel cutoff is enabled at an instant at which vehicle-speed controller 5 also requests correspondingly low setpoint torque Msetpoint. It is thus ensured that the overrun fuel cutoff sets in as early as possible, for example when driving downhill, and setpoint speed vsetpoint is exceeded by actual speed vactual as minimally as possible. A further advantage of the method according to the present invention is that the dependence on the gear selected is taken into consideration in the described torque observation. For high gear ratios at low gears, setpoint torque Msetpoint requested by vehicle-speed controller 5 reduces more slowly than for low gear ratios at high gears. Therefore, it takes longer, in the case of high gear ratios at low gears, for setpoint torque Msetpoint of vehicle-speed controller 5 to be less than first minimum torque Mmin1 and threshold value SW and for the overrun fuel cutoff to be enabled. This effect is desirable and causes a rarer enabling of the overrun fuel cutoff at higher gear ratios, when the surge of the overrun fuel cutoff is clearly detectable for the driver.

What is claimed is:

1. A method for operating a drive unit of a vehicle comprising:
   predetermining a setpoint value for a torque or a power output of the drive unit, with a vehicle-speed controller; and
   enabling an overrun fuel cutoff of the drive unit as soon as the setpoint value for the torque or the power output falls below a characteristic value for the overrun fuel cutoff.

2. The method according to claim 1, further comprising selecting a minimum actual value, which is reached by the torque or the power output in the event of overrun fuel cutoff, as the characteristic value.

3. The method according to claim 1, further comprising selecting a threshold value, which is less than a minimum actual value reached by the torque or the power output in the event of overrun fuel cutoff, as the characteristic value.

4. The method according to claims 1, 2, or 3, further comprising setting the torque or the power output to a minimum value for the torque or the power output without overrun fuel cutoff, if the setpoint value for the torque or the power output exceeds the characteristic value for overrun fuel cutoff and falls below the minimum value for the torque or the power output without overrun fuel cutoff.

5. The method according to claim 4, wherein:
   the drive unit is operated using an internal combustion engine; and
   the minimum value for the torque or the power output without overrun fuel cutoff is reached when a minimum amount of fuel required for operating the internal combustion engine is supplied.

6. The method according to claim 4, wherein the drive unit is operated using an internal combustion engine.

7. The method according to claim 4, wherein:

the drive unit is operated using an internal combustion engine;

in the event of overrun fuel cutoff, the minimum actual value is reached without supplying fuel to the internal combustion engine; and the minimum value for the torque or the power output without overrun fuel cutoff is reached when a minimum amount of fuel required for operating the internal combustion engine is supplied.

8. The method according to claims 1, 2, or 3, wherein the drive unit is operated using an internal combustion engine.

9. The method according to claims 2 or 3, wherein:

the drive unit is operated using an internal combustion engine; and in the event of overrun fuel cutoff, the minimum actual value is reached without supplying fuel to the internal combustion engine.

* * * * *